United States Patent
Wang et al.

(10) Patent No.: US 12,046,076 B2
(45) Date of Patent: Jul. 23, 2024

(54) VEHICLE MONITORING SYSTEM AND VEHICLE MONITORING METHOD

(71) Applicant: STREAMAX TECHNOLOGY CO., LTD., Guangdong (CN)

(72) Inventors: Rui Wang, Guangdong (CN); Yipeng Gao, Guangdong (CN)

(73) Assignee: STREAMAX TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/619,881

(22) PCT Filed: Aug. 5, 2019

(86) PCT No.: PCT/CN2019/099222
§ 371 (c)(1),
(2) Date: Dec. 16, 2021

(87) PCT Pub. No.: WO2019/238142
PCT Pub. Date: Dec. 19, 2019

(65) Prior Publication Data
US 2022/0358769 A1    Nov. 10, 2022

(51) Int. Cl.
*G06V 40/16* (2022.01)
*B60Q 1/50* (2006.01)
(Continued)

(52) U.S. Cl.
CPC ........... *G06V 40/172* (2022.01); *B60W 50/14* (2013.01); *G06V 20/56* (2022.01); *G06V 20/593* (2022.01); *B60Q 1/5035* (2022.05)

(58) Field of Classification Search
CPC ........... B60W 50/14; B60W 2050/143; B60W 2050/146; B60W 50/16; G06V 20/53;
(Continued)

(56) References Cited

U.S. PATENT DOCUMENTS

| 2009/0112452 | A1* | 4/2009 | Buck | G08G 1/09675 |
| | | | | 340/988 |
| 2012/0209450 | A1* | 8/2012 | Nagai | G07C 5/085 |
| | | | | 701/1 |

(Continued)

FOREIGN PATENT DOCUMENTS

| CN | 102855475 A | 1/2013 |
| CN | 202871056 U | 4/2013 |

(Continued)

OTHER PUBLICATIONS

English Translation of International Search Report for International Application No. PCT/CN2019/099222; Date of Completion: Mar. 17, 2020; Date of Mailing: Apr. 1, 2020; 3 Pages.

(Continued)

*Primary Examiner* — Nathnael Aynalem
(74) *Attorney, Agent, or Firm* — CANTOR COLBURN LLP (57) ABSTRACT

A vehicle monitoring system and a vehicle monitoring method, the vehicle monitoring system comprising: a camera module, used for photographing one or more first images and one or more second images after a vehicle starts, the first images being obtained by photographing embarking passengers, the second images being obtained by photographing disembarking passengers; a processing module, connected to the camera module, and used for performing facial analysis on the first images to determine the passengers embarking the vehicle, performing facial analysis on the second images to determine the passengers disembarking the vehicle, and sequentially matching the embarking passengers with the disembarking passengers; a reminder module, connected to the processing module, and used for pushing a left-behind passenger message to a driver if there is an embarking passenger who cannot be matched with a disem- (Continued)

barking passenger, to warn the driver that there is a passenger currently left behind in the vehicle.

16 Claims, 1 Drawing Sheet

(51) Int. Cl.
  *B60W 50/14* (2020.01)
  *G06V 20/56* (2022.01)
  *G06V 20/59* (2022.01)

(58) Field of Classification Search
  CPC ........ G06V 20/54; G06V 20/56; G06V 20/59; G06V 20/593; G06V 20/597; G06V 40/172
  USPC .......................................................... 348/148
  See application file for complete search history.

(56) References Cited

U.S. PATENT DOCUMENTS

| | | | |
|---|---|---|---|
| 2016/0009294 A1* | 1/2016 | Gunaratne | G08G 1/096866 701/36 |
| 2017/0001650 A1* | 1/2017 | Park | B60W 30/06 |
| 2018/0061151 A1* | 3/2018 | Chainer | H04W 4/40 |
| 2019/0114563 A1* | 4/2019 | Yukimoto | G07C 9/37 |
| 2020/0070657 A1* | 3/2020 | Kim | A61B 5/11 |
| 2020/0192357 A1* | 6/2020 | Park | G05D 1/0055 |

FOREIGN PATENT DOCUMENTS

| | | |
|---|---|---|
| CN | 103213502 A | 7/2013 |
| CN | 107516079 A | 12/2017 |
| CN | 207570802 U | 7/2018 |
| CN | 109961611 A | 7/2019 |
| KR | 101602250 B1 | 3/2016 |
| TW | 201824199 A | 7/2018 |

OTHER PUBLICATIONS

International Search Report for International Application No. PCT/CN2019/099222; Date of Completion: Mar. 30, 2020; Date of Mailing: Apr. 24, 2020; 5 Pages.
Written Opinion for International Application No. PCT/CN2019/099222; International Filing Date: Aug. 5, 2019; Date of Mailing: Apr. 1, 2020; 3 Pages.
Extended European Search Report for European Application No. 19820631.0 Issued Apr. 29, 2022, 12 Pages.
Gandhi, T. et al. "Vehicle Surround Capture: Survey of Techniques and a Novel Omni-Video-Based Approach for Dynamic Panoramic Surround Maps", IEEE Transactions on Intelligent Transporation Systems, IEEE, Piscataway, NJ, USA, vol. 7, No. 3, Sep. 1, 2006, pp. 293-308.
Kang, H. "Various Approaches for Driver and Driving Behavior Monitoring: a Review", 2013 IEEE International Conference on Computer Vision Workshops, IEEE, Dec. 2, 2013, pp. 616-623.
Torstensson, M. et al. "In-vehicle Driver and Passenger Activity Recognition", 37th Annual Swedish Symposium on Image Analysis (SSBA 2019), Gothernburg, Sweden, [Online] Mar. 16, 2019; 4 Pages.

* cited by examiner

VEHICLE MONITORING SYSTEM AND VEHICLE MONITORING METHOD

CROSS REFERENCE TO RELATED APPLICATIONS

This application is a National Stage of PCT Application No. PCT/CN2019/099222 filed on Aug. 5, 2019, the content of which is incorporated herein by reference thereto.

TECHNICAL FIELD

The present application relates to the field of monitoring technologies, and particularly to a vehicle monitoring system and a vehicle monitoring method.

BACKGROUND

At present, more and more people have paid attention to vehicle security issues, it is already not the first time in the society that a driver was not aware of a person being left behind in the vehicle when leaving the vehicle, which eventually results in cases that the person left behind is stifled or dehydrated to die.

Technical Problem

For a school bus shuttling students, due to the usual large number of students shuttled by the school bus and the shortage of drivers and following teachers, etc., it is difficult to effectively monitor each of the students riding the school bus.

Technical Solutions

Given this, the present application provides a vehicle monitoring system and a vehicle monitoring method, which can reduce the situations that the passenger is left in the vehicle, thereby ensuring the safety of the passengers.

A first aspect of the present application provides a vehicle monitoring system, which includes:

a camera module configured to capture more than one first image and more than one second image after a vehicle is started, where the first image is obtained by capturing an image of persons getting on the vehicle and the second image is obtained by capturing an image of persons getting off the vehicle;

a processing module connected to the camera module and configured to: perform face analysis on the first image to determine the persons getting on the vehicle, perform face analysis on the second image to determine the persons getting off the vehicle, and match each of the persons getting on the vehicle with each of the persons getting off the vehicle in turn; and a reminder module connected to the processing module and configured to: push a message that a passenger is left in the vehicle to a driver if there is the person getting on the vehicle who is not able to be matched with the persons getting off the vehicle, so as to remind the driver that this person is still left in the current vehicle.

A second aspect of the present application provides a vehicle monitoring method, which includes:

capturing more than one first image and more than one second image after a vehicle is started, where the first image is obtained by capturing an image of persons getting on the vehicle and the second image is obtained by capturing an image of persons getting off the vehicle;

performing face analysis on the first image to determine the persons getting on the vehicle, and performing face analysis on the second image to determine the persons getting off the vehicle;

matching each of the persons getting on the vehicle with each of the persons getting off the vehicle in turn; and pushing a message that a passenger is left in the vehicle to a driver if there is the person getting on the vehicle who is not able to be matched with the persons getting off the vehicle, so as to remind the driver that this person is still left in the current vehicle.

Beneficial Effects

It can be seen from the above that, the present application provides a vehicle monitoring system, which includes: a camera module configured to capture more than one first image and more than one second image after a vehicle is started, where the first image is obtained by capturing an image of persons getting on the vehicle and the second image is obtained by capturing an image of persons getting off the vehicle; a processing module connected to the camera module and configured to: perform face analysis on the first image to determine the persons getting on the vehicle, perform face analysis on the second image to determine the persons getting off the vehicle, and match each of the persons getting on the vehicle with each of the persons getting off the vehicle in turn; and a reminder module connected to the processing module and configured to: push a message that a passenger is left in the vehicle to a driver if there is the person getting on the vehicle who is not able to be matched with the persons getting off the vehicle, so as to remind the driver that this person is still left in the current vehicle. Through the technical solutions of the present application, the matching of the persons getting on the vehicle with the persons getting off the vehicle can quickly determine whether there is a person left in the current vehicle, and the specific information of this person left in the vehicle can be acquired quickly, so as to inform the driver in time, thereby avoid safety issues.

DESCRIPTION OF THE DRAWINGS

In order to more clearly illustrate the technical solutions in the embodiments of the present application, the drawings needed to be used in the description for the embodiments or the prior art will be briefly introduced below. Obviously, the accompanying drawings in the following description are only some embodiments of the present application, and other drawings may be obtained based on these drawings for those of ordinary skill in the art without creative work.

EMBODIMENTS OF THE APPLICATION

In the following description, for the purpose of illustration rather than limitation, specific details, such as a specific system structure and a specific technology, etc., are proposed for a thorough understanding of the embodiments of the present application. However, it should be understood to those skilled in the art that the present application can also be implemented in other embodiments without these specific details. In other cases, detailed descriptions of well-known systems, devices, circuits, and methods are omitted to avoid unnecessary details from obstructing the description of the present application.

It should be understood that when used in the specification and appended claims of the present application, the term "comprising" indicates the existence of a described feature, whole, step, operation, element and/or component, but does not exclude the existence or addition of one or more other features, wholes, steps, operations, elements, components, and/or collections thereof.

It should also be understood that the term "and/or" used in the specification and appended claims of the present application refers to any combination and all possible combinations of one or more of the items listed in association, and includes these combinations.

As used in the specification and appended claims of the present application, the term "if" may be construed as "when" or "once" or "in response to determination of . . . " or "in response to detecting . . . ". Similarly, the phrase "if . . . is determined" or "if [a described condition or event] is detected" may be interpreted as meaning "once . . . is determined" or "in response to determination of . . . " or "once [a described condition or event] is detected" or "in response to detection of [a described condition or event]" depending on the context.

In addition, in the description of the specification and appended claims of the present application, the terms "first", "second", "third", etc. are only used to distinguish the description, and cannot be understood as indicating or implying relative importance.

The reference to "one embodiment" or "some embodiments" described in the specification of the present application means that one or more embodiments of the present application include a specific feature, structure, or characteristic described in combination with this embodiment. Therefore, it is not necessary for all the phrases "in one embodiment", "in some embodiments", "in some other embodiments", "in additional other embodiments", etc. appearing in different places of the present specification refer to the same embodiment, but they may mean "one or more but not all embodiments", unless otherwise specifically emphasized in other ways. The terms "including", "comprising", "having" and their variations all mean "including but not limited to . . . ", unless otherwise specifically emphasized in other ways.

In order to illustrate the above-mentioned technical solutions of the present application, specific embodiments are used for illustration below.

First Embodiment

Figure 1:
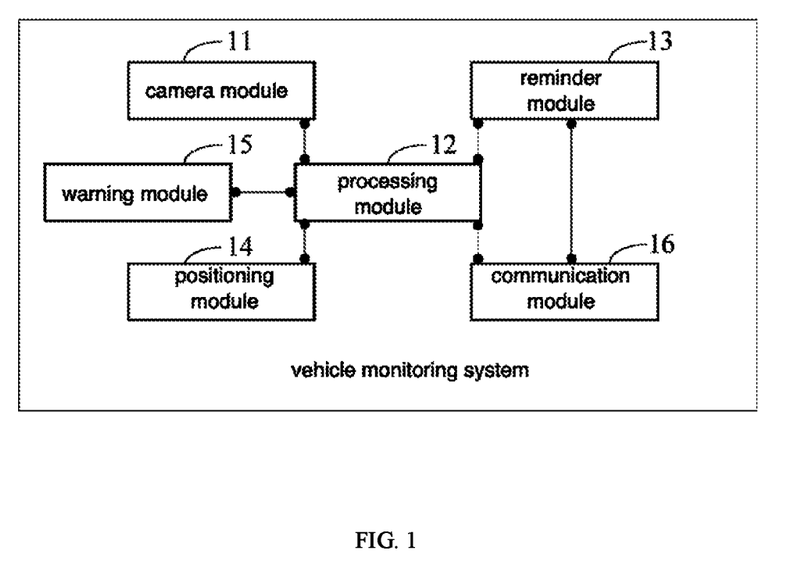
FIG. 1 is a framework schematic of a vehicle monitoring system provided by an embodiment of the present application.

An embodiment of the present application proposes a vehicle monitoring system, and the structure of the vehicle monitoring system will be explained and described below. Please refer to FIG. 1, FIG. 1 shows a framework schematic of the vehicle monitoring system 1.

The vehicle monitoring system 1 specifically includes a camera module 11, a processing module 12 and a reminder module 13. The camera module 11 and the reminder module 13 are both connected to the processing module 12. Optionally, the connection may be a wireless connection or a wired connection. The connection mode between the camera module 11 and the processing module 12 and the connection mode between the reminder module 13 and the processing module 12 are not limited herein.

Specifically, the camera module 11 is configured to capture more than one first image and more than one second image after a vehicle is started, where the first image is obtained by capturing an image of persons getting on the vehicle, and the second image is obtained by capturing an image of persons getting off the vehicle;

the processing module 12 is configured to perform face analysis on the first image to determine the persons getting on the vehicle, perform face analysis on the second image to determine the persons getting off the vehicle, and match each of the persons getting on the vehicle with each of the persons getting off the vehicle in turn;

the reminder module 13 is configured to push a message that a passenger is left in the vehicle to a driver if there is the person getting on the vehicle who is not able to be matched with the persons getting off the vehicle, so as to remind the driver that this person is still left in the current vehicle.

In an embodiment of the present application, the camera module 11 includes a camera arranged at a door of the vehicle. Specifically, according to an installation situation of the door of the vehicle, there may be one or more cameras arranged at the door, and the number of the cameras is not limited herein. Specifically, the camera module 11 uses an ISP (Image Signal Processing) technology to collect images and videos. The processing module 12 uses an ARM (Advanced RISC Machine) chip to work, and is capable of receiving and analyzing the images and videos transmitted over from the camera module 11.

Here, after the vehicle is ignited and started, the camera module 11 immediately starts to work. The driver is a person who often drives the vehicle, and the vehicle monitoring system 1 may pre-store face information of the driver. In this way, the camera module 11 may exclude the driver when collecting information of the persons getting on and getting off the vehicle subsequently. When each of the passengers gets on and gets off, the camera module 11 may collect the first image and the second image containing their facial information, and transmit the first image and the second image to the processing module 12. Specifically, the number of the first image and the second image is not limited. Optionally, an infrared sensor may be provided both inside and outside the door. When the infrared sensor inside the door senses approach of a person, the camera module 11 may be triggered to collect the second image containing the persons getting off the vehicle; when the infrared sensor outside the door senses approach of a person, the camera module 11 may be triggered to collect the second image containing the persons getting on the vehicle.

When analyzing the first image and the second image, the processing module 12 may first identify and analyze faces included in the first image and the second image. Specifically, considering that sometimes there may be crowded at the door, and there may be persons getting on and getting off the vehicle at the same time, that is, both the persons getting on the vehicle and the persons getting off the vehicle may be included in the collected first image or second image at the same time. Based on this, it may be determined whether the person corresponding to this face is a person getting on the vehicle or a person getting off the vehicle based on the orientation of the face contained in the first image or the second image. For example, when the face is analyzed as facing outside the vehicle, it is determined that the person corresponding to this face is the person getting off the vehicle; when the face is analyzed as facing inside the vehicle, it is determined that the person corresponding to this face is the person getting on the vehicle.

Considering that the camera module 11 may capture multiple images in a short time when capturing images, based on this, the faces of the persons getting on the vehicle may be deduplicated and the faces of the persons getting off the vehicle may be deduplicated first in order to improve subsequent matching efficiency. Specifically, the same face information collected multiple times is deduplicated in a short time (for example, within 3 seconds), for example, if the face of the person A1 getting on the vehicle is collected at time X1, and the face of the person A1 getting on the vehicle is also collected at time X2, and if the time interval between the time X1 and the time X2 is no more than 3 seconds, then it may be considered that the person getting on the vehicle performs the same boarding operation from the time X1 to the time X2. At this time, in order to avoid repeated collection of the information of the persons getting on the vehicle, deduplication is needed, and it is recorded as one boarding operation of A1. Correspondingly, it is also necessary to search for a getting-off operation of A1, that is, whether the face of the getting-off person A1 has been collected after the time X2. If so, it may be confirmed that the person A1 got off the vehicle after getting on the vehicle, that is, this person has not been left in the vehicle. Conversely, if there is one person getting on the vehicle who cannot match with one of the persons getting off the vehicle, for example, if only an image of the person A2 getting on the vehicle is collected and no image including the person A2 getting off the vehicle is collected, that is, A2 can only be found among the persons getting on the vehicle, but A2 cannot be found among the persons getting off the vehicle, which results in that the getting-on person A2 cannot find its matched getting-off person, then it may be considered that the person A2 is left in the vehicle.

Further, during the analysis of the processing module 12, attention should be paid to the following matters: there may be a situation in which a person gets on the vehicle, gets off the vehicle, and then gets on the vehicle again. For example, a user A3 gets on the vehicle at time X3, then gets off the vehicle at time X4, and then gets on the vehicle at time X5 again. When a person gets on and off the vehicle multiple times, there will be inevitably a period of time interval among the multiple times of getting on the vehicle before and after, that is, the time interval between the time X3 and the time X5 often exceeds the time threshold (for example, 3 Seconds) used in the deduplication, based on this, the deduplication operation cannot be performed for the getting-on person A3 collected at the time X3 and the getting-on person A3 collected at the time X5, then at this time, the getting-on person A3 needs to be matched with the persons getting off the vehicle who are captured after the time when this person gets on the vehicle last time (that is, the time X5), that is, the getting-on person A3 is matched with the persons getting off the vehicle after the time X5. If there is a person getting off the vehicle after the time X5 and matched with the getting-on person A3, then this match is considered to be successful; if there is no person getting off the vehicle after the time X5 and matched with the getting-on person A3, then this match is considered to be failed.

In other words, when matching the persons getting on the vehicle and the persons getting off the vehicle, for the same getting-on person who appears at different time points, it is necessary to obtain the last boarding time of this getting-on person, and the getting-off person matched with this getting-on person is searched in times after the last boarding time; if the matched getting-off person can be found, then it is confirmed that this getting-on person is not left in the vehicle; if the matched getting-off person can not be found, it is confirmed that this getting-on person was left in the vehicle.

The reminder module 13 may push the message that a passenger is left in the vehicle to the driver by means of voice, or may push the message that a passenger is left in the vehicle to the driver by means of an image and/or text manner, which is not limited here.

Optionally, the processing module 12 may be further subdivided into an image processing module and an image analysis module. The image processing module includes an ARM chip containing a GPU (Graphics Processing Unit), which can facilitate the speed of image processing, such that the overall performance and effects of the image processing are improved. The image processing module and the reminder module 13 may be integrated in a vehicle-mounted terminal, which may be arranged near the driver's seat for the driver to use. The vehicle-mounted terminal may include components such as a speaker, a display screen, etc. Then, the reminder module 13 may push the message that a passenger is left in the vehicle to the driver through the speaker and/or display screen of the vehicle-mounted terminal, which is not limited here. The above-mentioned image analysis module may be integrated in a cloud to perform abnormal analysis on each of the images and videos collected by the camera module 11. The above-mentioned image analysis module may perform detection, classification, tracking, and behavior analysis etc. on the persons in the image based on deep learning, which is not limited here.

Optionally, in order to improve the processing efficiency of the processing module 12 and avoid unnecessary data processing operations by the processing module 12, the vehicle monitoring system 1 further includes:

a positioning module 14 connected to the processing module 12 and configured to acquire a real-time location of the current vehicle;

correspondingly, the processing module 12 is specifically configured to sequentially match each of the persons getting on the vehicle with each of the persons getting off the vehicle when the real-time location has arrived at a designated target location.

In an embodiment of the present application, the positioning module 14 may also be integrated in the vehicle-mounted terminal. Specifically, the positioning module 14 may perform positioning through a GPS (Global positioning System), or may also perform positioning through a Beidou system, a Galileo system, or a GLONASS system, which is not limited here. Specifically, before the start of the day's trip, the driver can set the target location based on the final destination of the day's itinerary. Theoretically, when the vehicle arrives at the final destination of the day, all passengers on the vehicle should get off, so the matching operation between the getting-on persons and the getting-off persons is only performed when the vehicle has arrived at the designated target location, and each of the getting-on persons is matched with each of the getting-off persons in turn to determine whether there is a person left in the vehicle.

Optionally, in addition to detecting whether there is a person left in the vehicle and ensuring the safety of each passenger, the vehicle monitoring system 1 may also detect the behavior of each vehicle passenger to prevent abnormal events from occurring on the vehicle, then the camera module 11 may further be configured to capture a real-time video of passengers onboard the vehicle, where the passengers are those currently carried by the vehicle;

the processing module 12 is further configured to perform behavior analysis on each of the passengers according to the video;

the reminder module 13 is further configured to send a message indicating the abnormal passenger to the driver when there is an abnormal passenger to remind the driver to pay attention to the abnormal passenger, where the abnormal passenger is a passenger having an abnormal behavior and indicated by a result of the behavior analysis.

In an embodiment of the present application, regarding the aforementioned camera module 11, not only the door of the vehicle may be provided with a camera, but also the interior of the vehicle may be provided with a camera, so as to collect the video of the persons currently carried by the vehicle during vehicle traveling. Specifically, when the vehicle is a vehicle with a large volume such as a big bus, cameras may be installed in multiple areas of a carriage of the vehicle, which is not limited here. The behavior analysis is performed for each of the passengers to determine whether there is a passenger with an abnormal behavior. Specifically, the abnormal behavior includes, but is not limited to: running on the vehicle, making a fuss, etc., which is not limited here. When there is an abnormal passenger, the message indicating the abnormal passenger may be sent to the driver through the speaker and/or display screen of the vehicle-mounted terminal, to remind the driver to pay attention to the abnormal passenger, so as to realize on-site supervision of the abnormal passenger and avoid severe incidents affecting the driving safety of the driver.

Optionally, in an application scenario, when the vehicle is a school bus, considering that the passengers taking the school bus are often students who have poor self-control and self-restraint capabilities, therefore, the processing module 12 is further configured to acquire personnel information of the abnormal passenger;

correspondingly, the vehicle monitoring system 1 further includes: a communication module 16 connected to the processing module 12 and configured to upload and update the personnel information to a preset first database, where the first database is stored in a preset cloud.

In an embodiment of the present application, considering that the students of the school often do not undergo major changes during one academic year, therefore, the facial information of each of the students in the school can be collected in advance, and the personal information of each of the students, such as name, gender, class, home address and emergency contact phone number, etc. can be recorded accordingly. The facial information and personal information of each of the students may be stored in a second database of the above mentioned cloud. When the processing module 12 finds that there is an abnormal passenger through analyzing, it can obtain the personnel information related to this abnormal passenger from the second database based on the facial information of this abnormal passenger, and update this personnel information to the first database. That is to say, the personnel information stored in the first database is the personnel information of the passengers who have ever shown abnormal behaviors on the vehicle. When these abnormal passengers, such as a student who is more naughty or likes to fight in the vehicle, take other school buses, the driver or the following teacher is notified to pay attention to these students through performing face recognition on these students when they get on the bus, thereby promptly avoiding the cases that these students chase or fight in the bus again. Optionally, when the abnormal behavior of the abnormal passenger is out of control, the driver may also call the emergency contact phone number of the abnormal passenger based on the obtained personnel information associated with this abnormal passenger, so as to help calm down the abnormal conditions on site, which is not limited here.

Further, the processing module 12 may also analyze whether each passenger is sleeping in the vehicle, and upload the sleeping status of each passenger to the cloud; alternatively, the processing module 12 can directly transmit the passenger video to the cloud through the communication module 16, and whether the passengers are sleeping in the vehicle is analyzed in the cloud to reduce the processing pressure of the processing module. The cloud can analyze the historical situations of each passenger, and determine the passenger who has slept a lot of times in the vehicle as a passenger easily falling sleep. Then, when there is the passenger easily falling sleep among the getting-on persons, the cloud can further push a passenger sleep message to the driver based on this passenger easily falling sleep, so that the driver can focus on these passengers easily falling sleep in the vehicle, so as to prevent the passengers from a dangerous accident due to sleeping.

Optionally, in addition to detecting whether there are people left in the vehicle, the vehicle monitoring system 1 may further detect abnormal situations outside the vehicle, and the camera module 11 is further configured to collect a traveling video of the vehicle in real time during a traveling process of the vehicle;

the processing module 12 is further configured to analyze a traveling environment of the vehicle according to the traveling video;

the reminder module 13 is further configured to push a route change message to the driver when an abnormal traveling environment is detected, to remind the driver to change a current traveling route.

In an embodiment of the present application, the camera module 11 may not only include a camera arranged at the door of the vehicle, but also may include a camera arranged outside the vehicle to collect an environmental video outside the vehicle, that is, to collect the traveling video of the vehicle. Specifically, in order to realize omni-directional environmental monitoring, a camera may be arranged at external front, external rear, external left, and external right of the vehicle respectively; of course, the camera may also be installed only on the external front of the vehicle, which is not limited here. During the traveling of the vehicle, the traveling video of the vehicle is collected in real time, and real-time analysis is performed on the collected traveling video. When an abnormal traveling environment is detected based on the analysis of the traveling video, such as a car accident, a heavy traffic, etc., the route change message may be pushed to the driver through the display screen of the vehicle-mounted terminal, to remind the driver to change the current traveling route. Specifically, the processing module 12 may first obtain the traveling destination and the original traveling route, and then plan a new traveling route based on the original traveling route and the traveling destination, and push the route change message to the driver based on the new traveling route.

Optionally, in addition to detecting whether there is a person left in the vehicle, the vehicle monitoring system 1 may further detect an abnormal situation of the driver when the driver drives the vehicle, and the camera module 11 is further configured to collect a driving video of the driver in real time during the traveling process of the vehicle;

the processing module 12 is further configured to perform behavior analysis on a driving behavior of the driver according to the driving video;

the reminder module 13 is further configured to push a safe driving message to the driver when an abnormal driving behavior of the driver is detected, so as to remind the driver to pay attention to safe driving.

In an embodiment of the present application, the camera module 11 may not only include a camera arranged at the door of the vehicle, but also may include a camera arranged near the driver's seat of the vehicle to collect the driving video of the driver when the driver drives the vehicle. The processing module 12 may perform behavior analysis on the driving behavior of the driver in the driving video, and specifically analyze whether the driver smokes, makes a phone call, or drives with fatigue, which is not limited here. When an abnormal driving behavior of the driver is shown through analyzing based on the driving video, the safe driving message may be pushed to the driver through the display screen of the vehicle-mounted terminal, to remind the driver to pay attention to safe driving. Further, the processing module 12 may further count the number of the abnormal driving behaviors of the driver; then the vehicle monitoring system 1 may further, by using the communication module 16 connected to the processing module 12, upload the driving video of the driver and the number of the abnormal driving behaviors to the preset cloud when the number of the abnormal driving behaviors exceeds a preset number. The cloud may adjust the driver's work arrangement according to the situation of the abnormal driving behaviors of driver. For example, when the driver shows too many abnormal driving behaviors, the work arrangement for the driver during a next period of time is changed to another driver, which is not limited here.

Optionally, the vehicle monitoring system 1 may further provide an external warning based on a working condition of the vehicle itself, and then the processing module 12 is further configured to obtain dashboard data of the vehicle; accordingly, the vehicle monitoring system 1 further includes a warning module 15 configured to output a warning message to outside when the dashboard data of the vehicle indicates a malfunction of the vehicle.

In an embodiment of the present application, the processing module 12 is provided in the vehicle-mounted terminal, and the vehicle-mounted terminal may further be connected to a bus of the vehicle to obtain the dashboard data of the vehicle. When it is determined that the current vehicle is malfunctioning based on the dashboard data of the vehicle, in order to avoid a vehicle accident, a warning message may be output through the warning module 15 installed outside the vehicle to remind other nearby vehicles to pay attention to avoidance. Optionally, the warning module 15 may include a display screen and/or a speaker, which is not limited here.

Optionally, the processing module may upload the detected abnormal situations, such as presence of a passenger left in the vehicle, presence of an abnormal passenger, presence of an abnormal driving behavior of the driver, presence of an abnormal traveling environment, or the like, to the cloud through the communication module 16. When the abnormal situation is relatively urgent, the cloud may call the corresponding emergency phone number based on abnormal types of the above-mentioned various abnormal situations, and push a notification to the reminder module 13 of the vehicle-mounted terminal through the communication module 16, to remind the driver to stop and deal with it.

It can be seen from the above that, the vehicle monitoring system proposed based on the embodiments of the present application can realize monitoring of the possible various abnormal situations of the vehicle (including presence of a passenger left in the vehicle, presence of an abnormal passenger, presence of an abnormal driving behavior of the driver, presence of an abnormal traveling environment, or the like) through the cameras mounted on the vehicle, and remind and warn the driver and other related persons when the abnormal situations are detected, thereby realizing comprehensive and intelligent vehicle safety monitoring and further improving the driving safety of the vehicle.

Second Embodiment

Figure 2:
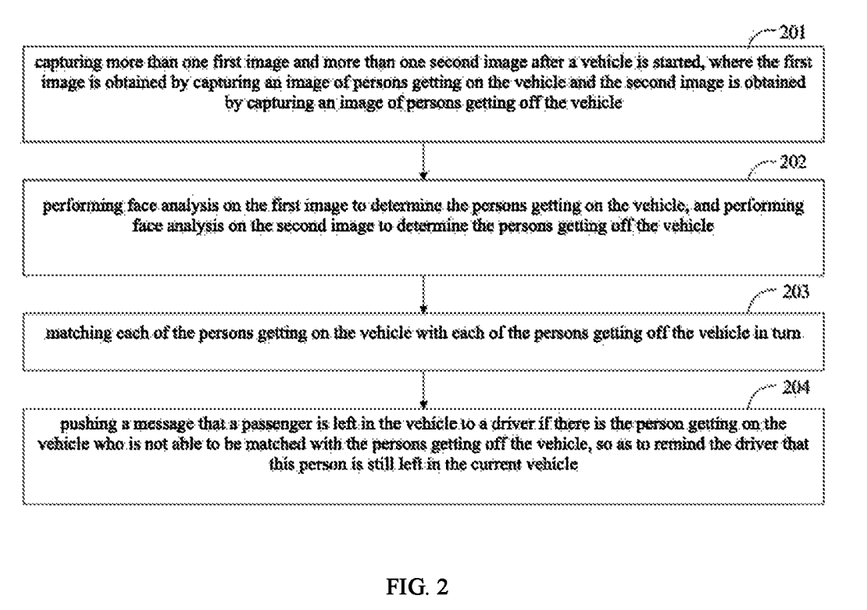
FIG. 2 is flow diagram of an implementation of a vehicle monitoring method provided by an embodiment of the present application.

A vehicle monitoring method provided by an embodiment of the present application is described below, and the vehicle monitoring method is applied in the vehicle monitoring system proposed above. Please refer to FIG. 2, the vehicle monitoring method in an embodiment of the present application includes:

at a step 201, capturing more than one first image and more than one second image after a vehicle is started, where the first image is obtained by capturing an image of persons getting on the vehicle, and the second image is obtained by capturing an image of persons getting off the vehicle;

at a step 202, performing face analysis on the first image to determine the persons getting on the vehicle, and performing face analysis on the second image to determine the persons getting off the vehicle;

at a step 203, matching each of the persons getting on the vehicle with each of the persons getting off the vehicle in turn; and at a step 204, pushing a message that a passenger is left in the vehicle to a driver if there is the person getting on the vehicle who is not able to be matched with the persons getting off the vehicle, so as to remind the driver that this person is still left in the current vehicle.

Optionally, the vehicle monitoring method further includes:

obtaining a real-time location of the current vehicle;

correspondingly, the step of matching each of the persons getting on the vehicle with each of the persons getting off the vehicle in turn includes:

sequentially matching each of the persons getting on the vehicle with each of the persons getting off the vehicle when the real-time location has arrived at a designated target location.

Optionally, the vehicle monitoring method further includes:

capturing a real-time video of passengers onboard the vehicle, where the passengers are those currently carried by the vehicle;

performing behavior analysis on each of the passengers according to the video; and sending a message indicating the abnormal passenger to the driver when there is an abnormal passenger to remind the driver to pay attention to the abnormal passenger, where the abnormal passenger is a passenger having an abnormal behavior and indicated by a result of the behavior analysis.

Optionally, when there is an abnormal passenger, the vehicle monitoring method further includes:

obtaining personnel information of the abnormal passenger; and updating the personnel information to a preset first database, where the first database is stored in a preset cloud.

Optionally, the vehicle monitoring method further includes:

collecting a traveling video of the vehicle in real time during a traveling process of the vehicle;

analyzing a traveling environment of the vehicle according to the traveling video; and pushing a route change message to the driver when an abnormal traveling environment is detected, to remind the driver to change a current traveling route.

Optionally, the pushing a route change message to the driver includes:

obtaining a traveling destination and an original traveling route;

planning a new traveling route based on the original traveling route and the traveling destination; and pushing the route change message to the driver based on the new traveling route.

Optionally, the vehicle monitoring method further includes:

collecting a driving video of the driver in real time during the traveling process of the vehicle;

performing behavior analysis on a driving behavior of the driver according to the driving video; and pushing a safe driving message to the driver when an abnormal driving behavior of the driver is detected, to remind the driver to pay attention to safe driving.

Optionally, the vehicle monitoring method further includes:

counting a number of the abnormal driving behavior of the driver; and uploading the driving video of the driver and the number of the abnormal driving behavior to the preset cloud when the number of the abnormal driving behavior of the driver exceeds a preset number.

Optionally, the vehicle monitoring method further includes:

obtaining dashboard data of the vehicle; and outputting a warning message to outside when the dashboard data of the vehicle indicates a malfunction of the vehicle.

It should be understood that the sequence numbers of the steps in the foregoing embodiments do not mean execution sequences. The execution sequences of the processes should be determined by their functions and internal logic, and should not constitute any limitation to the implementation processes of the embodiments of the present application.

It can be seen from the above that, the vehicle monitoring method proposed based on the embodiments of the present application can realize monitoring of the possible various abnormal situations of the vehicle (including presence of a passenger left in the vehicle, presence of an abnormal passenger, presence of an abnormal driving behavior of the driver, presence of an abnormal traveling environment, or the like) through the cameras mounted on the vehicle, and remind and warn the driver and other related persons when the abnormal situations are detected, thereby realizing comprehensive and intelligent vehicle safety monitoring and further improving the driving safety of the vehicle.

It will be clearly understood by those skilled in the art that, for convenience and brevity of description, the division of the various functional modules described above is only exemplified. In practical applications, the above functions may be completed through assigning them to different functional modules according to needs. That is, the internal structure of the system is divided into different functional modules to perform all or part of the functions described above. The various functional modules in the embodiments may be integrated into one module, or each of the modules may exist physically separately, or two or more modules may be integrated into one module. The above integrated module may be implemented in a form of hardware, or may be implemented in a form of software functional module. In addition, the specific names of the respective functional modules are only for the purpose of facilitating mutual differentiation, and are not intended to limit the protection scope of the present application. Regarding the specific implementation processes of the modules of the foregoing method, reference may be made to the corresponding working processes of the modules in the foregoing system embodiments, and details of which will be not described herein again.

In the above embodiments, each of the embodiments is described with particular emphasis, and parts that are not detailed or described in a certain embodiment may refer to related description of other embodiments.

Those of ordinary skill in the art will appreciate that, the exemplary modules and method steps described in combination with the embodiments disclosed herein may be implemented by electronic hardware, or a combination of software of an external device and electronic hardware. Whether these functions are performed in hardware or software depends on a specific application and a design constraint of the technical solution. A person skilled in the art may use different methods to implement the described functions for each particular application, and such implementation should not be considered to be beyond the scope of the present application.

In the embodiments provided by the present application, it should be understood that the disclosed apparatus and method may be implemented in other manners. For example, the system embodiments described above are merely illustrative. For example, the division of the modules is only a division for logical functions, and there may be other division manners in actual implementation, for example, the plurality of modules may be combined or integrated into another system, or some features may be ignored or not executed. In addition, the mutual coupling or direct coupling or communication connection as shown or discussed may be indirect coupling or communication connection through some interfaces, modules, or may be electrical or mechanical, or may be in other forms.

The modules described as separate components may or may not be physically separate. The components displayed as modules may or may not be physical modules, that is, may be located in one place, or may be distributed to a plurality of network modules. Some or all of the modules may be selected according to actual needs to achieve the purpose of the solutions of the embodiments.

The integrated module, if implemented in the form of the software functional module and sold or used as a stand-alone product, may be stored in a computer-readable storage medium. Based on such understanding, the present application may implement all or part of the processes in the above embodiments through commanding related hardware by a computer program, and the computer program may be stored in the computer readable storage medium. The computer program, when executed by the processor, may implement the steps of the various method embodiments described above. Where, the computer program includes a computer program code, and the computer program code may be in a form of a source code, an object code, an executable file, or some intermediate forms. The computer-readable medium may include: any entity or apparatus capable of carrying the computer program code, a recording medium, a USB flash disk, a removable hard disk, a magnetic disk, an optical disk, a computer-readable memory, a read-only memory (ROM), a random access memory (RAM), an electrical carrier signal, a telecommunication signal, or software distribution media or the like. It should be noted that, the content contained in the computer readable medium may be appropriately increased or decreased according to requirements of legislation and patent practice in a jurisdiction. For example, in some jurisdictions, according to the legislation and the patent practice, the computer readable medium does not include the electrical carrier signal and telecommunication signal.

The above embodiments are only used to illustrate the technical solutions of the present application, and are not intended to be limiting. Although the present application has been described in detail with reference to the foregoing embodiments, those of ordinary skill in the art should understand that the technical solutions disclosed in the above embodiments may be modified, or some of the technical features may be replaced by equivalents. These modifications or substitutions do not depart corresponding technical solutions from the spirit and scope of the technical solutions of the embodiments of the present application, and should be included in the protection scope of the present application.

What is claimed is:

1. A vehicle monitoring system, comprising:
    a camera module configured to capture more than one first image and more than one second image after a vehicle is started, wherein the first image is obtained by capturing an image of persons getting on the vehicle and the second image is obtained by capturing an image of persons getting off the vehicle;
    a processing module connected to the camera module and configured to: perform face analysis on the first image to determine the persons getting on the vehicle, perform face analysis on the second image to determine the persons getting off the vehicle, and match each of the persons getting on the vehicle with each of the persons getting off the vehicle in turn; and
    a reminder module connected to the processing module and configured to: push a message that a passenger is left in the vehicle to a driver if there is the person getting on the vehicle who is not able to be matched with the persons getting off the vehicle, so as to remind the driver that this person is still left in the current vehicle;
    wherein the processing module is provided in a vehicle-mounted terminal;
    the vehicle monitoring system further comprises a communication module connected to the processing module;
    the processing module is configured to upload detected abnormal situations including presence of an abnormal passenger, presence of an abnormal driving behavior of the driver, presence of an abnormal traveling environment, to a cloud through the communication module; when a detected abnormal situation is urgent, the reminder module is further configured to receive a notification for reminding the driver to stop the vehicle, which is pushed by the cloud through the communication module;
    wherein the processing module is further configured to collect facial information of each student in school in advance, and record personal information of each student accordingly, and store the facial information and the personal information of each student in a second database of the cloud;
    the processing module is further configured to acquire personnel information of the abnormal passenger from the second database based on facial information of the abnormal passenger;
    the communication module is further configured to update the personnel information of the abnormal passenger to a preset first database, wherein the preset first database is stored in the cloud, the personal information stored in the preset first database is the personal information of passengers who have ever shown abnormal behaviors on the vehicle.

2. The vehicle monitoring system of claim 1, wherein the vehicle monitoring system further comprises:
    a positioning module connected to the processing module and configured to acquire a real-time location of the current vehicle;
    correspondingly, the processing module is specifically configured to sequentially match each of the persons getting on the vehicle with each of the persons getting off the vehicle when the real-time location has arrived at a designated target location.

3. The vehicle monitoring system of claim 1, wherein the camera module is further configured to capture a real-time video of passengers onboard the vehicle, wherein the passengers are passengers currently carried by the vehicle;
    the processing module is further configured to perform behavior analysis on each of the passengers according to the real-time video;
    the reminder module is further configured to send a message indicating the abnormal passenger to the driver when there is an abnormal passenger to remind the driver to pay attention to the abnormal passenger, wherein the abnormal passenger is a passenger having an abnormal behavior and indicated by a result of the behavior analysis.

4. The vehicle monitoring system of claim 1, wherein the camera module is further configured to collect a traveling video of the vehicle in real time during a traveling process of the vehicle;
    the processing module is further configured to analyze a traveling environment of the vehicle according to the traveling video;
    the reminder module is further configured to push a route change message to the driver when an abnormal traveling environment is detected, to remind the driver to change a current traveling route.

5. The vehicle monitoring system of claim 4, wherein the reminder module is specifically configured to: acquire a traveling destination and an original traveling route, plan a new traveling route based on the original traveling route and the traveling destination, and push the route change message to the driver based on the new traveling route.

6. The vehicle monitoring system of claim 1, wherein the camera module is further configured to collect a driving video of the driver in real time during a traveling process of the vehicle;
    the processing module is further configured to perform behavior analysis on a driving behavior of the driver according to the driving video;
    the reminder module is further configured to push a safe driving message to the driver when an abnormal driving behavior of the driver is detected, so as to remind the driver to pay attention to safe driving.

7. The vehicle monitoring system of claim 6, wherein the processing module is further configured to count a number of the abnormal driving behavior of the driver;

correspondingly, the vehicle monitoring system further comprises:
a communication module connected to the processing module and configured to upload the driving video of the driver and the number of the abnormal driving behavior to a preset cloud when the number of the abnormal driving behavior exceeds a preset number.

8. The vehicle monitoring system of claim 1, wherein the processing module is further configured to acquire dashboard data of the vehicle;
correspondingly, the vehicle monitoring system further comprises:
a warning module connected to the processing module and configured to output a warning message to outside when the dashboard data of the vehicle indicates a malfunction of the vehicle.

9. A vehicle monitoring method, comprising:
capturing more than one first image and more than one second image after a vehicle is started, wherein the first image is obtained by capturing an image of persons getting on the vehicle and the second image is obtained by capturing an image of persons getting off the vehicle;
performing face analysis on the first image to determine the persons getting on the vehicle, and performing face analysis on the second image to determine the persons getting off the vehicle;
matching each of the persons getting on the vehicle with each of the persons getting off the vehicle in turn; and
pushing a message that a passenger is left in the vehicle to a driver if there is the person getting on the vehicle who is not able to be matched with the persons getting off the vehicle, so as to remind the driver that this person is still left in the current vehicle;
the method further comprises:
uploading detected abnormal situations including presence of an abnormal passenger, presence of an abnormal driving behavior of the driver, presence of an abnormal traveling environment to a cloud through a communication module; and
receiving, when a detected abnormal situation is urgent, a notification for reminding the driver to stop the vehicle from the cloud through the communication module;
the method further comprising:
collecting facial information of each of student in school in advance, and record personal information of each student accordingly, and storing the facial information and the personal information of each student in a second database of the cloud;
wherein when the presence of the abnormal passenger is detected, the vehicle monitoring method further comprises:
obtaining personnel information of the abnormal passenger from the second database based on facial information of the abnormal passenger; and
updating the personnel information to a preset first database, wherein the preset first database is stored in the cloud, the personal information stored in the preset first database is the personal information of passengers who have ever shown abnormal behaviors on the vehicle.

10. The vehicle monitoring method of claim 9, wherein the vehicle monitoring method further comprises:
obtaining a real-time location of the current vehicle;
correspondingly, the matching each of the persons getting on the vehicle with each of the persons getting off the vehicle in turn comprises:
sequentially matching each of the persons getting on the vehicle with each of the persons getting off the vehicle when the real-time location has arrived at a designated target location.

11. The vehicle monitoring method of claim 9, wherein the vehicle monitoring method further comprises:
capturing a real-time video of passengers onboard the vehicle, wherein the passengers are those currently carried by the vehicle;
performing behavior analysis on each of the passengers according to the real-time video; and
sending a message indicating the abnormal passenger to the driver when there is an abnormal passenger to remind the driver to pay attention to the abnormal passenger, wherein the abnormal passenger is a passenger having an abnormal behavior and indicated by a result of the behavior analysis.

12. The vehicle monitoring method of claim 9, wherein the vehicle monitoring method further comprises:
collecting a traveling video of the vehicle in real time during a traveling process of the vehicle;
analyzing a traveling environment of the vehicle according to the traveling video; and
pushing a route change message to the driver when an abnormal traveling environment is detected, to remind the driver to change a current traveling route.

13. The vehicle monitoring method of claim 12, wherein the pushing a route change message to the driver comprises:
obtaining a traveling destination and an original traveling route;
planning a new traveling route based on the original traveling route and the traveling destination; and
pushing the route change message to the driver based on the new traveling route.

14. The vehicle monitoring method of claim 9, wherein the vehicle monitoring method further comprises:
collecting a driving video of the driver in real time during a traveling process of the vehicle;
performing behavior analysis on a driving behavior of the driver according to the driving video; and
pushing a safe driving message to the driver when an abnormal driving behavior of the driver is detected, to remind the driver to pay attention to safe driving.

15. The vehicle monitoring method of claim 14, wherein the vehicle monitoring method further comprises:
counting a number of the abnormal driving behavior of the driver; and
uploading the driving video of the driver and the number of the abnormal driving behavior to a preset cloud when the number of the abnormal driving behavior of the driver exceeds a preset number.

16. The vehicle monitoring method of claim 9, wherein the vehicle monitoring method further comprises:
obtaining dashboard data of the vehicle; and
outputting a warning message to outside when the dashboard data of the vehicle indicates a malfunction of the vehicle.

* * * * *